United States Patent [19]
Bhatia et al.

[11] 4,339,758
[45] Jul. 13, 1982

[54] ELECTROSENSITIVE RECORDING

[75] Inventors: Sushil Bhatia, Framingham; Ralph J. Shuman, Needham, both of Mass.

[73] Assignee: Dennison Manufacturing Company, Framingham, Mass.

[21] Appl. No.: 263,964

[22] Filed: May 15, 1981

[51] Int. Cl.³ .................. G01D 15/24; G01D 9/00
[52] U.S. Cl. ................. 346/1.1; 346/135.1
[58] Field of Search ............ 346/135.1, 76 L, 1.1

[56] References Cited
U.S. PATENT DOCUMENTS

| | | | |
|---|---|---|---|
| Re. 28,336 | 2/1975 | Dalton | 346/135.1 X |
| 3,665,483 | 5/1972 | Becker et al. | 346/135.1 X |
| 3,861,952 | 1/1975 | Tokumoto et al. | 346/135.1 X |
| 4,069,487 | 1/1978 | Kasai et al. | 346/76 L |
| 4,217,596 | 8/1980 | Jung | 346/135.1 |

*Primary Examiner*—Donald A. Griffin
*Attorney, Agent, or Firm*—Barry D. Josephs; George E. Kersey; Arthur B. Moore

[57] ABSTRACT

Electrosensitive recording using a composite structure formed by a base support for a resinous contrast layer containing silicon dioxide, with an overlying metallic surface provided by vapor deposition. The electrosensitive structure provides improved print quality for information recorded by electrically actuated stylii, with reduced debris accumulation.

33 Claims, 2 Drawing Figures

ELECTROSENSITIVE RECORDING

BACKGROUND OF THE INVENTION

1. Field of the Invention

The present invention relates to electrosensitive recording in which a metallic surface is electrically penetrated at designated locations to record information.

2. Description of the Prior Art

Electrosensitive recording materials typically have a base layer of paper that supports a resinous contrast coating on one side. A further coating of vapor-deposited metal, such as aluminum, covers the free surface of the resinous contrast coating. When electrical current is passed through a stylus or blade in contact with the metallized surface, the metal is vaporized along the path of contact of the stylus. This exposes the contrasting resinous layer, which prevents the vaporized metal from penetrating into the paper. The resinous coating also acts as a barrier to moisture vapor transmission and protects the paper base against chemical corrosion during the metal vaporization process. The resinous coating may include pigmentation such as carbon black. The resinous coating may further include additives, such as matting agents to reduce the gloss of the metallized surface, or pigments to provide a pronounced contrast to the metallic surface where the latter has been removed.

Contemporary printers for electrosensitive material have the disadvantage that print quality has not been as good as that obtained with competing printers. Another disadvantage has been the tendency to accumulate debris around the stylus, necessitating frequent shutdown of the printer for cleaning. Specifically, in the development of electrosensitive paper for use as a recording medium in computer output printers it heretofore has not been possible to produce a reasonably priced electrosensitive paper which could meet a large number of physical requirements, including, high tensile and tearing strength, high burst strength, good fingerprinting resistance, desired resistivity, favorable barrier properties, minimal structural curling, proper matte appearance, suitable print quality and limited production of debris during recording. It is also important that the electrosensitive paper not cause appreciable stylus wear.

Representative electrosensitive recording paper of the prior art employs a paper base layer covered by a contrast layer of a lacquer coating or printing ink, which in turn is covered by metallic aluminum. Illustrative U.S. Pat. Nos. of the prior art include 3,786,518; 3,831,179; 3,995,083; and 4,217,596.

In U.S. Pat. No. 3,831,179 an intermediate contrast layer of cellulose-based lacquer is used to produce corrosion resistance and has good barrier properties in that it prevents moisture vapor from being transmitted through to the paper base layer. This structure has the disadvantage that the contrast of the exposed resinous layer where the metallic surface is burned away is not satisfactory.

Numerous attempts have been made to improve the contrast between the recorded information and the outer metallic layer of the electrosensitive medium. Typically, carbon black pigment is added to the intermediate lacquer layer to produce a matting effect in an attempt to improve contrast. Such is the case in U.S. Pat. No. 3,995,083. Since carbon black is an electrical conductor, the amount which can be added is limited by the need to avoid current flow through the carbon black additive which can produce distortion of the intermediate layer by overheating.

In U.S. Pat. No. 3,786,518, an amorphous silicon oxide additive is added to enhance the matte properties of the intermediate lacquer layer. This is to improve the contrast between the recorded information and an aluminum coating. Although amorphous silicon oxide improves contrast, it also causes a rapid buildup of debris around the stylus. This detracts from print quality and necessitates frequent shutdown of the printer for cleaning as noted in U.S. Pat. No. 4,217,596. Because of the disadvantages of silicon dioxide, an alternative additive is suggested in U.S. Pat. No. 4,217,596 in the form of a combustible organic matte-causing substance, preferably polystyrene or polyethylene. The use of an organic, combustible matte-producing additive has the advantage over silicon oxide that practically no deposits will occur on the writing electrodes. Unlike silicon oxide, the organic matte-causing additive is burnt off upon recording. The result is very little, if any, residue around the electrodes. But organic matte-producing additives have the disadvantage of producing a diminished contrast effect. Other illustrative patents of the prior art include U.S. Pat. Nos. 2,833,677; 3,657,721; 3,861,952; and 4,024,546.

Accordingly, it is an object of the present invention to provide improved contrast in electrosensitive recording materials. A related object is to improve the contrast between the recorded information and the metallic outer surface of the recording material.

Another important object of the invention is to reduce the wear on the recording instrumentalities used with electrosensitive materials. A related object is to reduce stylus wear and also the buildup and retention of debris deposits, particularly those produced when the stylus comes into contact with the recording medium.

It is a further object of the invention to provide economical electrosensitive recording media having an array of desirable physical characteristics, including: printability, strength, flexibility, and reduced debris-causing characteristics.

SUMMARY OF THE INVENTION

In accomplishing the foregoing and related objects, the invention provides an electrosensitive assemblage in which an intermediate contrast layer composed of a resinous dispersion of a film forming resin supplemented by a mixture of amorphous silicon and crystalline silicon dioxide.

This formulation unexpectedly achieves improved contrast characteristics and simultaneously reduces the accumulation and retention of debris deposits during recording. It has been discovered that even a minor amount of crystalline silica added to amorphous silica suprisingly causes a marked reduction in the accumulation and retention of debris deposits around electrical stylii used in the recording process.

The crystalline silicon dioxide preferably constitutes between about 0.08 to 2.6 percent by weight of the dried contrast layer, most preferably 0.7 to 1.2 percent. Such a mixture produces a contrast coating with marked reduction in debris deposits, without causing undue wear of the stylii. The total amount of crystalline and amorphous silicon dioxide preferably may be present in the range between about 8 to 26 weight percent of the dried contrast coating layer, most preferably about 13 weight percent. The weight ratio of crystalline silicon dioxide to amorphous silicon dioxide in the filler is preferably in the range from about 0.01/1 to 0.10/1, advantageously about 0.05/1.

It is not known why the addition of small amounts of crystalline silicon dioxide so markedly reduces the accumulation of debris deposits around each stylus. Applicants theorize that the crystalline silicon dioxide has a hardness due to its crystalline character, and it promotes the scraping away of debris from the contrast layer. The result is a reduction in the retention of debris around each stylus.

The resinous dispersion to which the amorphous and crystalline silicon fillers are added may be any film-forming resin, including primary and secondary film-forming resins. However, an acrylic ester resin such as polymethylmethacrylate is preferred. The resinous dispersion may include a pigment such as carbon black or alternately a dye such as nigrosinebased black to enhance the contrast between the recorded information and the metallic layer. A dispersing agent preferably a surfactant may be included in the resinous dispersion.

Although crystalline silicon dioxide is employed in combination with amorphous silicon dioxide for best effect, it has been discovered that the use of crystalline silicon dioxide alone as a filler for film-forming resins, without inclusion of amorphous silicon dioxide, will cause a significant reduction in the accumulation and retention of debris deposits. The inclusion of amorphous silica improves the wear characteristics of the medium.

Crystalline silicon dioxide can also be added to film-forming resins containing organic or inorganic matting agents other than amorphous silicon dioxide. When thus used, the crystalline silicon dioxide preferably comprises at least about 0.08 weight percent of the dried contrast coating and more preferably between about 0.4 to 6.0 weight percent of the dried coating layer.

DESCRIPTION OF THE DRAWINGS

Other aspects of the invention will become apparent after considering several illustrative embodiments of the invention taken in conjunction with the drawings in which.

DETAILED DESCRIPTION

Figure 1:
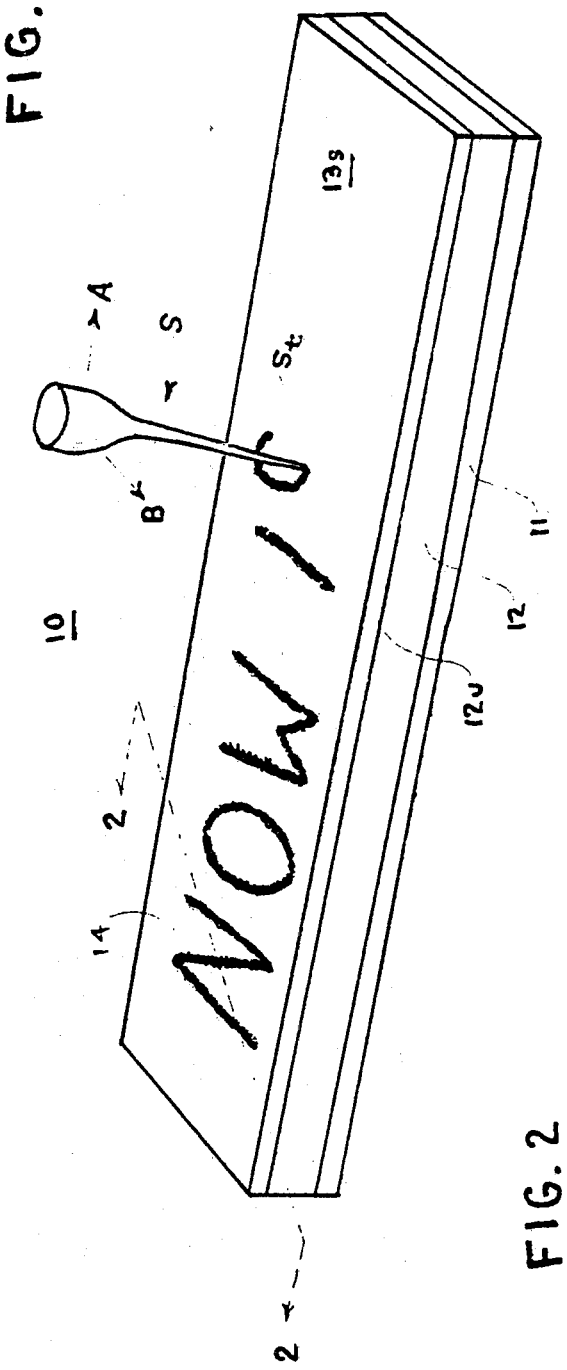
FIG. 1 is a perspective view of an illustrative electrosensitive strip in accordance with the invention being used to receive information with an electrically actuatable stylus.
Figure 2:
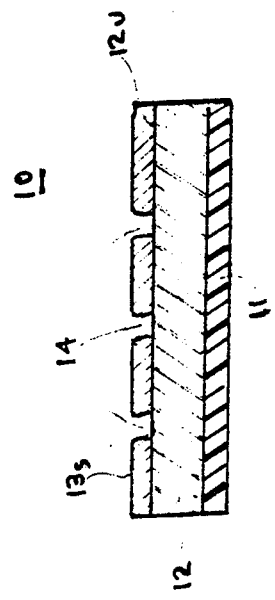
FIG. 2 is a cross section of the strip of FIG. 1.

With reference to the drawings, an electrosensitive recording medium 10 in accordance with the invention includes a base or support member 11, a contrast layer 12 uniformly coated on the base paper, and a vapor-deposited coating 13 of aluminum, which covers the upper surface 12u of the contrast layer 12. Although aluminum is preferred for the vapor-deposited coating 13, other materials may be used such as cadmium, nickel, or oxides of aluminum.

The medium 10 is employed in electrosensitive recording, using for example an electrically actuatable stylus S with a tip $S_t$ in contact with the metallic outer surface $13_s$ of the medium 10, which takes the form of a strip in FIG. 1. The stylus S is moved over the surface $13_s$ in the direction indicated by arrows A and B and electrically actuated to selectively burn away or vaporize the surface $13_s$ in accordance with the information 14 to be recorded.

The contrast layer 13 is provided by a film-forming resin, pigment and a filler including crystalline silicon dioxide, as well as one or more solvents. The crystalline silicon dioxide may be added as a filler alone to the film-forming resin, or it may be added in combination with amorphous silicon dioxide filler or other organic or inorganic matting agents. The crystalline silicon dioxide may be combined with any film-forming resin, including for example ethyl cellulose, polyethylene, nitrocellulose, polyvinylacetate, cellulose acetate, polyvinylchloride, copolymers of vinyl chloride and vinyl acetate, cellulose acetatebutyrate, methylmethacrylate, methylacrylate, ethylacrylate, butylacrylate, polystyrene, copolymers of styrene and maleic acid, copolymers of styrene and acrylic acid, and copolymers of vinyl ether and maleic acid. The contrast layer 13 may include a dispersing and wetting agent, preferably a surfactant.

When the crystalline silicon dioxide is used as a filler without amorphous silicon dioxide, the crystalline silicon dioxide should be at least about 0.08 percent by weight of the dried contrast coating layer, and preferably between about 0.4 to 6 weight percent. When the crystalline silicon dioxide filler is admixed with amorphous silicon dioxide the weight ratio of crystalline silicon dioxide to amorphous silicon dioxide should be at least 0.01/1 and preferably in a range between about 0.01/1 to about 0.10/1. The combined weight of the crystalline silicon dioxide and amorphous silicon dioxide should be at least about 8 percent by weight of the dried contrast coating layer, preferably between about 8 to 26 percent by weight. The average particle size of the crystalline silicon dioxide is preferably about 2.0 to 10 microns, while the average particle size of the amorphous silicon dioxide is preferably about 1.0 to 15 microns.

A Formulation "A" for the contrast layer is set forth in Table I. Formulation "A" is a resinous dispersion containing a film-forming resin, preferably an acrylic ester resin such as that sold under the trademark ACRYLOID 66 manufactured by Rohm and Haas Company Philadelphia, Pennsylvania.

As shown in Table I, toluene and ethyl acetate solvents in the designated amounts are advantageous for the acrylic ester resin. It should be appreciated, however, that other suitable volatile solvents may be used for the resinous dispersion depending on the constituent film forming resin or resins. Preferably, the solvents should have a boiling point under 400° F. preferably between about 100° F. to 400° F. at atmospheric pressure and not adversely effect the free dispersion of the fillers within the resinous dispersion. The carbon black pigment used in the formulation of Table I may be of any industrial type. The preferred surfactant is non-ionic, such as that available under the tradename TENLO 70 from the Diamond Shamrock Corporation Morristown, New Jersey. The silica fillers are mixed into the resinous dispersion in the amounts shown in Table I to produce a complete liquid contrast coating layer. The preferred fillers are an amorphous silica comprised essentially of 99.7 weight percent amorphous silicon dioxide with an average particle size of about 4.3 microns. This is sold under the trademark SYLOID 378 from W. R. Grace and Co., Davison Chemical Division, Baltimore, Maryland, and crystalline silica comprised essentially of 99.48 weight percent crystalline silicon dioxide with an average particle size of about 2.7 microns, sold under the trademark MINUSIL 15 by Pittsburgh Glass and Sand Corp. of Pittsburgh, Pennsylvania.

An alternate contrast coating formulation "B" is tabulated in Table II. Carbon black pigment is not used in this formulation but instead is substituted by a nigrosine-base dye. The black dye liquid contrast coating formulation of Table II is formed by a resinous dispersion containing a film-forming resin, preferably ethylcellulose, and a filler of amorphous silica and crystalline silica admixed into the resinous dispersion in the proportions set forth in Table II. The nigrosine dye black of Table II is available from American Cyanamide Corporation of Boundbrook, New Jersey.

Preferred solvents for coating Formulation "B" are ethanol toluene, and ethylene glycol monobutyl ether shown in Table II. It will be appreciated that other volatile solvents for ethylcellulose are equally suitable. Ethylene glycol monobutyl ether is available under the trademark BUTYL-CELLOSOLVE from Union Carbide Corp., New York, N.Y.

Once formulated, the liquid contrast coating, such as Formulation "A" or "B", is applied to a base paper sheet and dried by conventional convective heaters to evaporate the solvents, producing a dried contrast coating layer as shown in Tables I and II. A metallic layer, such as aluminum, is then vapor-deposited onto the free surface of the dried contrast coating layer to produce the electrosensitive paper product.

The electrosensitive paper product of the invention with a contrast coating layer of either of the formulations in Tables I and II exhibits excellent print contrast characteristics. It also exhibits marked reduction in the accumulation of debris deposits around each stylus. Test results for the debris deposit accumulations around stylii using formulations shown in Tables I and II were compared with identical formulations omitting crystalline silica. When crystalline silica was not included only three rolls of the electrosensitive paper (235 ft. per roll) could be passed through the stylus for recording before debris deposits accumulated to such a degree around the stylus to necessitate shutdown of the printer for cleaning.

However, in test runs using electrosensitive paper having a contrast layer in accordance with either formulation set forth in Tables I and II—including crystalline silica—at least eighteen rolls and typically thirty rolls of the electrosensitive paper could be passed through the printer before there was sufficient wear on the stylus and/or sufficient debris accumulation to interfere with the acceptable level of print quality.

Thus, the printer run life for the same coating composition including crystalline silica increased at least sixfold, and typically increased ten-fold (i.e. from 3 rolls to 30 rolls) for replacement of the stylus and/or cleaning. This is believed to represent a significant advance in solving a long recognized problem of debris accumulation previously encountered with silicon dioxide based fillers.

Additionally, electrosensitive recording paper in accordance with the invention has a number of other important physical characteristics—making the paper particularly suitable as a recording medium for electrosensitive printers. In addition to improved contrast print quality and significantly reduced debris accumulation, other improved physical characteristics include strength, gloss, moisture vapor-transmission rate, fingerprint resistance, electrical resistivity, bursting strength, tear strength, and flexibility all of which are required for print media used with computer printer output terminals.

Typical physical characteristics of electrosensitive paper made in accordance with the formulations of either Table I or Table II are summarized in Table III, in which the actual physical characteristics of the electrosensitive paper of the invention are compared with the physical property specifications required for paper as a print medium for a computer output print terminal. It is readily observed from Table III that the electrosensitive paper of the invention has physical characteristics well within the required range for each one of the specification standards tabulated in Table III.

TABLE I

| Contrast Coating-Formulation A: Resinous Dispersion A: | Comp. Wt. % |
|---|---|
| Polymer Resin | |
| Acrylic Ester (e.g. ACRYLOID 66) | 20.0 |
| Solvent 1 | |
| Toluene | 46.2 |
| Solvent 2 | |
| Ethyl Acetate | 20.8 |
| Carbon Black Pigment | 9.9 |
| Surfactant | |
| (e.g. TENLO 70 - NONIONIC SURFACTANT) | 3.1 |
| | 100.00 |
| The Liquid Contrast Coating Formulation A has the following composition: | Parts by Weight |
| Resinous Dispersion A having above composition | 95.2 |
| Fillers | |
| Amorphous Silicon Dioxide (e.g. SYLOID 378) | 4.56 |
| Crystalline Silicon Dioxide (e.g. MINUSIL 15) | 0.24 |
| | 100.00 |
| Dried Contrast Coating - Formulation A | Comp., Wt. % |
| Polymer Resin | |
| Acrylic Ester (e.g. ACRYLID 66) | 52.6 |
| Carbon Black Pigment | 26.0 |
| Surfactant (e.g. TENLO 70) | 8.1 |
| Amorphous Silicon Dioxide (e.g. SYLOID 378) | 12.6 |
| Crystalline Silicon Dioxide (e.g. MINUSIL 15) | 0.7 |
| | 100.0 |

TABLE II

| Contrast Coating-Formulation B Resinous Dispersion B: | Comp. Wt. % |
|---|---|
| Polymer Resin | |
| Ethyl Cellulose | 13.6 |
| Dye Black | |
| Nigrosine Base | 6.8 |
| Solvent (i) | |
| Ethanol | 36.1 |
| Solvent (ii) | |
| Toluene | 38.2 |
| Solvent (iii) | |
| Butoxyethanol (e.g. butyl-CELLOSOLVE) | 5.3 |
| | 100.00 |
| The Liquid Contrast Coating-Formulation B has the following composition: | Parts by Wt. |
| Resinous Dispersion B having above composition | 93.20 |
| Fillers | |
| Amorphous Silicon Dioxide (e.g. SYLOID 378) | 6.48 |
| Crystalline Silicon Dioxide (e.g. MINUSIL 15) | 0.32 |

TABLE II-continued

|  | 100.00 |
|---|---|
| Dried Contrast Coating - Formulation B | Comp. Wt. % |
| Polymer Resin Ethyl Cellulose | 49.3 |
| Dye Black Nigrosine Base | 24.4 |
| Amorphous Silicon Dioxide (e.g. SYLOID 378) | 25.1 |
| Crystalline Silicon Dioxide (e.g. MINUSIL 15) | 1.2 |
|  | 100.0 |

TABLE III
PHYSICAL PROPERTY TEST RESULTS

|  | Typical Test Results For Product As In Table I and II | Minimum Required For Use In Computer Output Printers |
|---|---|---|
| Paper Base Layer, LBS./REAM (3,000 sq. ft.) | 35 | 32 |
| Contrast Coating Layer, LBS./REAM (3,000 sq. ft.) | 2.0 ± 0.5 | 1.4 |
| Aluminum Layer, Resistivity ohms/cm$^2$ | 2.2 | 1.5 to 3.0 |
| Roughness (Aluminum Layer), Sheffield Smoothness Test | 40 | 25 to 100 |
| Whiteness Index, % Hunter Colorimeter (ASTM E313) | 81 | 70 |
| Gloss, % Percent reflectance measured at 60° angle of incidence with Hunter Gloss Meter. |  |  |
| Machine Direction | 20 | Less than 40 |
| Cross Direction | 19 | Less than 40 |
| Fingerprinting, % A sample coated with vacuum pump oil was allowed to stand for 35 minutes and its reflectance was compared with that of an unoiled sample using an opacimeter. | 85 | 70 |
| Structural curl, mm |  |  |
| At 20% Relative Humidity | 6 | Less than 30 |
| At 75% Relative Humidity | 18 | Less than 30 |
| Burst Strength, Kilopascal Mullen Test | 129 | 100 |
| Resistance to Tear, gms. TAPPI TEST T414 |  |  |
| Machine Direction | 41 | 60 |
| Cross Direction | 63 | 60 |
| Print Quality | VERY GOOD PRINT QUALITY AND CONTRAST | — |
| Run Length of Electrosensitive Paper Before Print Head (Stylus) Wears Down. | 18 to 30 rolls (4,230 ft. to 7,050 ft.) | 18 |

Methods of manufacturing electrosensitive paper using the contrast coatings of Tables I and II are set forth in the following non-limiting examples:

EXAMPLE 1

A batch of liquid contrast coating is prepared in accordance with Formulation A of Table I, as a dispersion by feeding the constituents into a ball milling vessel in accordance with the proportions set forth in Table I. The mixture is mixed thoroughly by ball milling the constituents with ceramic balls for a period of at least 3 to 4 hours at ambient conditions to form a resinous mixture in which the carbon black pigment and resin were homogeneously dispersed. Although ball milling is preferred, other forms of milling such as attrited or sand milling may be used.

Resinous Dispersion A is then transferred to a vessel and stirred with an air stirrer. The amorphous silica (SYLOID 378) and crystalline silica (MINUSIL 15) fillers are added to the Resinous Dispersion and stirred continuously to form a mixture of 95.2 parts by weight of Dispersion, 4.56 parts by weight SYLOID 378 and 0.24 parts by weight MINUSIL 15. The mixture is stirred with an air stirrer for 10 to 15 minutes until a homogeneous liquid contrast coating product is formed.

The liquid coating mixture formulation A is next applied directly to a paper layer or is first further diluted with a 50/50 mixture of toluene and ethylacetate to bring the mixture to a preferred coating viscosity equal to a flow time of about 25 seconds as measured with a #2 Zahn cup. The latter permits easier and more efficient application of the liquid contrast coating. This results in a smoother coating when using a three roll reverse roller.

Alternatively, coatings may be prepared in accordance with Formulation A with only slightly less contrast by increasing the ball milling time to about 20 hours in forming the resinous dispersion.

The coating mixture is uniformly applied to one side of a chemically pulped free paper sheet having a basis weight of about 35 lbs./ream (3,000 sq. ft. per ream) by a conventional three-roll reverse roller to achieve a contrast coating layer having a basis weight of between about 1.5 to 3.0 lbs./ream (3,000 sq. ft. per ream). The coating is dried by conventional convective paper coating driers with hot air at 100° F. to 400° F. temperature. The drying time is preferably between about 10 seconds to 1 minute. Upon drying the solvents are evaporated, thus forming the dried contrast coating Formulation A having the composition set forth in Table I.

Pure aluminum (99.7% pure) is next vapor-deposited onto the outer surface of the contrast coating layer by conventional high-vacuum metallization to yield an electrosensitive paper product having a metallic resistivity of between about 1.0 to 3.0 ohms/square centimeter, preferably between about 1.5 to 3.0 ohms/square centimeter and the typical physical properties set forth in Table III.

When the resulting electrosensitive paper product was tested, at least 18 rolls (235 ft. per roll) and up to 30 rolls of the paper could be passed through the printer before there was enough debris accumulated, for example around a stylus, to significantly effect print quality and require shutdown of the printer for cleaning.

EXAMPLE 2

A batch of liquid contrast coating Formulation B is prepared in a manner similar to that recited in Example 1 except that ball milling is not used, since carbon black pigment is not present. Formulation B is prepared by mixing all the constituents with an air mixer in accordance with the proportions set forth in Table II. Preferably, the Resinous Dispersion B is formed by mixing the constituents listed in Table II in the proportions shown and using an air mixer to achieve a homogeneous resinous dispersion.

Then the amorphous silica (SYLOID 378) and crystalline silica (MINUSIL 15) fillers are added to the resinous dispersion to form a mixture comprised of 93.2 parts by weight resinous dispersion, 6.48 parts by weight SYLOID 378 and 0.32 parts by weight MINUSIL 15. This mixture is thoroughly mixed using an air mixer at ambient conditions for about 15-20 minutes until a homogeneous dispersion is achieved.

The resulting liquid contrast coating is applied directly to the paper layer or is first diluted with a 50/50 mixture of toluene and ethylacetate to bring the coating mixture to a preferred coating viscosity equal to a flow time of about 25 seconds as measured with a #2 Zahn cup. This preferred coating viscosity permits easier and more efficient application of the liquid contrast coating and results in a smoother coating when using a three roll reverse roller.

The coating mixture is uniformly applied to one side of a chemically pulped sheet paper having a basis weight of about 35 lbs./ream (3,000 sq. ft. per ream) by conventional three-roll reverse roller to achieve a contrast coating layer having a basis weight of between about 1.5 to 3.0 lbs./ream (3,000 sq. ft. per ream) by conventional three-roll reverse roller to achieve a contrast coating layer having a basis weight of between about 1.5 to 3.0 lbs./ream (3,000 sq. ft. per ream). Although chemically pulped free sheet paper is preferred other types of paper such as kraft or ground-wood sheet may be used, and the basis weight of the paper may typically be between about 20 to 40 lbs. per ream (3,000 sq. ft. per ream). The coating is then dried by conventional paper coating driers with hot air at successively higher temperatures from 100° to 400° F. The drying time is preferably between about 10 seconds to 1 minute. Upon drying the solvents are evaporated resulting in the dried contrast coating of Formulation B.

Pure aluminum (99.7% pure) is then vapor-deposited onto the outer surface of the coating layer by conventional high vacuum metallization. The result is an electrosensitive paper product having a metallic resistivity of between about 1.5 to 3.0 ohms per square centimeter and the typical physical properties set forth in Table III.

When the resulting electrosensitive paper product was tested, at least 18 rolls (235 ft. per roll) and typically 30 rolls could be passed through the printer before there was significant stylus wear and/or enough debris accumulation to significantly affect print quality and require shutdown of the printer for cleaning and/or stylus replacement.

It will be appreciated that other formulations for the contrast coating may be prepared in a manner similar to that set forth above. Similarly, the electrosensitive paper product may be prepared utilizing other formulations in a manner similar to that set forth in the above examples without departing from the spirit and scope of the invention.

We claim:

1. Electrosensitive recording material comprising:
   (a) a support,
   (b) a contrast material upon said support comprising a film forming resin and a filler comprised of crystalline silicon dioxide, and
   (c) a metallic substance upon said contrast material.

2. The electrosensitive material of claim 1 further including amorphous silicon dioxide in said filler.

3. An electrosensitive recording material as in claim 2 wherein the filler comprises at least 8% by weight of said coating layer.

4. An electrosensitive recording material as in claim 2 wherein the filler comprises between about 8% to about 26% by weight of said coating layer.

5. An electrosensitive recording material as in claim 2 wherein the weight ratio of crystalline silicon dioxide to amorphous silicon dioxide in said filler is in a range having a lower limit of about 0.01/1 and an upper limit of about 0.10/1.

6. An electrosensitive recording material as in claim 2 wherein the weight ratio of crystalline silicon dioxide to amorphous silicon dioxide in said filler is about 0.05/1.

7. An electrosensitive recording material as in claim 2 wherein the film forming resin in said coating layer is comprised of an acrylic ester.

8. An electrosensitive recording material as in claim 2 wherein the film forming resin comprises between about 25 to 75 percent by weight of said coating layer.

9. An electrosensitive recording material as in claim 2 wherein the film forming resin in said coating layer is comprised of at least 25 to 90 percent by weight ethyl cellulose.

10. An electrosensitive recording material as in claim 2 wherein the base layer is comprised of paper.

11. An electrosensitive recording material as in claim 10 wherein the vapor-deposited aluminum has a resitivity of between about 1.0 to 3.0 ohms per square centimeter.

12. An electrosensitive recording material as in claim 2 wherein the metallic layer is comprised of vapor-deposited aluminum.

13. An electrosensitive recording material as in claim 2 wherein the coating layer has a basis weight of between about 1.5 to 3.0 lbs./ream.

14. An electrosensitive recording material as in claim 2 wherein the film forming resin is selected from the group consisting of ethyl cellulose, polyethylene, nitrocellulose, polyvinylacetate, cellulose acetate, polyvinylchloride, copolymers of vinyl chloride and vinylacetate, cellulose acetate butyrate, methylmethacrylate, methylacrylate, ethylacrylate, butylacrylate, polystyrene, copolymers of styrene and maleic acid, copolymers of styrene and acrylic acid, and copolymers of vinyl ether and maleic acid.

15. Electrosensitive recording material comprising:
(a) a base member,
(b) a coating layer upon said base member comprising a film forming resin and a filler of crystalline silicon dioxide and amorphous silicon dioxide in a weight ratio of at least 0.01/1, and
(c) a metallic layer overlying said coating layer.

16. An electrosensitive recording material as in claim 15 wherein the amorphous silicon dioxide has an average particle size of about 1.0 to 15 microns and the crystalline silicon dioxide has an average particle size of about 2.0 to 10 microns.

17. An electrosensitive recording material as in claim 16 wherein said coating layer includes carbon black pigment.

18. An electrosensitive recording material as in claim 17 wherein said coating layer includes nigrosine base dye black.

19. An electrosensitive recording material comprising:
(a) a base,
(b) a coating layer substantially covering at least one side of said base and comprised of a film forming resin and a filler of crystalline silicon dioxide, and
(c) a metallic layer covering said coating layer.

20. An electrosensitive recording material as in claim 19 wherein the crystalline silicon dioxide comprises between about 0.4 to 6.0 percent by weight of the coating layer.

21. An electrosensitive paper as in claim 19 wherein the crystalline silicon dioxide has an average particle size of between about 2.0 to 10.0 microns.

22. An electrosensitive paper as in claim 19 wherein the film forming resin in said coating layer comprises between about 25 to 75 percent by weight of the coating layer.

23. An electrosensitive paper as in claim 19 wherein the film forming resin in said coating layer is an acrylic ester comprising at least 25 to 75 percent by weight of the coating layer.

24. An electrosensitive recording material as in claim 19 wherein the base layer is comprised of paper.

25. An electrosensitive recording material as in claim 19 wherein said metallic layer is comprised of vapor-deposited aluminum having a resistivity of between about 1.0 to 3.0 ohm per square centimeter.

26. An electrosensitive recording material as in claim 19 wherein said coating layer includes carbon black pigment comprising between about 10 to 35 weight percent of the coating layer.

27. An electrosensitive recording material as in claim 19 wherein the basis weight of the coating layer is between about 1.5 to 3.0 lbs. per ream.

28. An electrosensitive recording material as in claim 19 wherein the film forming resin is selected from the group consisting of ethylcellulose, polyethylene, nitrocellulose, polyvinylacetate, cellulose acetate, polyvinylchloride, copolymers of vinylchloride, and vinylacetate, cellulose acetate butyrate, methylmethacrylate, methylacrylate, ethylacrylate, butylacrylate, polystryene, copolymers of styrene and maleic acid, copolymers of styrene and acrylic acid, and copolymers of vinyl ether and maleic acid.

29. An electrosensitive recording material comprising:
(a) a base,
(b) a coating layer substantially covering at least one side of the base layer, said coating layer comprised of a film forming resin and a filler of crystalline silicon dioxide present in the coating layer in an amount at least 0.08 weight percent of the coating layer, and
(c) a metallic layer covering said coating layer.

30. The method of electrosensitive recording which comprises applying an electrically actuated implement to a metallic surface and penetrating the surface electrically to selectively expose portions of an underlying contrast layer, which includes crystalline silicone dioxide therein.

31. The method of preparing an improved electrosensitive recording medium which comprises adding a crystalline silicon dioxide to said medium.

32. The method of claim 31 wherein the medium includes a contrast material therein and said silicon dioxide is added to said contrast material.

33. The method of reducing the accumulation of debris deposits in electrosensitive recording, which comprises using an electrosensitive material which contains crystalline silicon dioxide therein.

* * * * *